United States Patent [19]

Lippacher et al.

[11] 4,171,083

[45] Oct. 16, 1979

[54] DRILLING AND DRIVING DEVICE

[75] Inventors: Wolfgang Lippacher, Breitbrunn; Gerhard Teger; Rudolf Reitberger, both of Munich, all of Fed. Rep. of Germany

[73] Assignee: Hilti Aktiengesellschaft, Schaan, Liechtenstein

[21] Appl. No.: 901,237

[22] Filed: Apr. 28, 1978

[30] Foreign Application Priority Data

May 2, 1977 [DE] Fed. Rep. of Germany ....... 2719574

[51] Int. Cl.² .......................... B23B 51/08; B25F 1/04

[52] U.S. Cl. ...................................... 227/69; 227/120; 227/147; 173/29; 7/143

[58] Field of Search ...................... 173/46, 29; 408/17, 408/22, 30; 227/69, 67, 27, 120, 147; 7/143, 158

[56] References Cited

PUBLICATIONS

Hilti, Toothless Anchors TZD, Hilti Fastening Systems, 1973.

*Primary Examiner*—Robert Louis Spruill
*Assistant Examiner*—Roscoe V. Parker
*Attorney, Agent, or Firm*—Toren, McGeady and Stanger

[57] ABSTRACT

A drilling and driving device provides, in combination, a drilling tool for drilling a borehole and a percussion attachment for driving fastening elements into the borehole. The drilling device includes a housing into which a drilling tool can be inserted. The percussion attachment is pivotally mounted on the housing so that it can be positioned over the drilling tool for driving the fastening element or it can be pivotally displaced so that the drilling tool can be used. In its displaced position, the percussion attachment can be loaded with a fastening element from a magazine located on the housing.

18 Claims, 4 Drawing Figures

DRILLING AND DRIVING DEVICE

SUMMARY OF THE INVENTION

The present invention is directed to a drilling and driving device and includes a housing for a motor and driving gears with the housing forming a grip handle and containing a tool holder into which a drilling tool can be inserted and a percussion attachment is pivotally mounted on the housing so that it can be positioned over the drilling tool for driving fastening elements into boreholes previously formed by the drilling tool when the attachment is pivotally displaced from the drilling tool.

The placement of so-called percussion or anchor dowels, that is, expansion dowels, which are expanded by driving a spreader element into a sleeve, has in the past been mainly a manual operation. Aside from a hammer for applying the energy required for driving in the spreader element, in most cases more or less specialized tools are required. As a result, the operation of placing such dowels is very cumbersome and relatively time-consuming. There is now available a tool which facilitates the spreading of the dowel by means of a hammer drill which has initially produced the borehole into which the dowel is inserted. The front end of the tool from which the dowel is inserted, includes an attachment having the shape of a pin or bolt while its rearward end is formed as a sleeve which is slipped onto the drill. To drill a borehole, the spreading tool must be removed from the device. Generally, the dowel is manually inserted into the borehole. To perform this operation, in most cases, the drilling device must be set aside. As an example, if the diameter of a borehole formed in a ceiling is somewhat larger than the diameter of the dowel, the dowel might fall out of the borehole while the drilling device is picked up and the spreading tool is slipped onto it. On the other hand, if borehole is formed in the ground or a floor surface, it is necessary to hold the spreading tool on the drilling device so that it will not become loosened or fall off. Because of these factors, using such a device is relatively cumbersome and the drilling and driving operation cannot be performed quickly.

The primary object of the present invention is to provide a drilling device which can also be used for driving dowels into the borehole formed by the drilling device.

In accordance with the present invention, a driving or percussion attachment is pivotally mounted on the front end of a drilling device, that is the end containing a tool holder into which a drilling tool is inserted. The attachment can be pivoted in front of and over the drilling tool, preventing use of the tool. The axis of rotation of the attachment extends perpendicularly to the axis of the drilling tool. When the driving or percussion attachment is pivoted into axial alignment with and over the drilling tool, it has a percussion shoulder which rests against the drilling tool. A sleeve-like portion of the attachment which laterally encloses the drilling tool includes a cutout permitting the attachment to be pivoted away from the drilling tool. Accordingly, the driving attachment is part of a drilling device and is pivotally connected to the device. While a borehole is being drilled, the attachment is pivoted out of the path of the drilling tool. After a borehole has been prepared, the attachment is pivoted so that it aligns axially with the drilling tool and its percussion shoulder bears against the rearward end of the drilling tool. As a driving force is transmitted to the drilling tool, the tool in turn, transmits the force to the percussion attachment which applies the force against the spreader member in a dowel assembly. In this arrangement, the attachment does not rotate. To facilitate the pivotal displacement of the percussion attachment from the axis of the drilling tool, a cutout is provided along an axial portion of the attachment. The cutout is in the form of a longitudinal slot and extends forwardly from the rearward end of the attachment. The width of the slot is at least slightly greater than the diameter of the drilling tool so that the tool will move through the cutout as the attachment is pivoted.

To carry out the entire dowel placement operation in an efficient manner including the insertion of the dowel into the borehole by the combined drilling and driving device, it is advantageous if the attachment includes a receiving sleeve into which fastening element can be inserted. The receiving sleeve laterally encloses at least a portion of the percussion attachment and is axially movable relative to it. Accordingly, a fastening elemement can be pushed into the receiving sleeve and, subsequently, inserted into a borehole by means of the drilling and driving device. The axial movability of the receiving sleeve relative to the percussion attachment facilitates the driving of a spreader element after the fastening element or dowel assembly has been inserted into the borehole.

To avoid premature spreading of the dowel assembly, which would prevent a full insertion of the dowel into a borehole, it is advantageous if the receiving sleeve is axially movable against the force of a spring element biasing it in the driving direction. Accordingly, when a dowel assembly or fastening element placement operation has been completed, the receiving sleeve is automatically returned to its initial position and is ready to receive another element or assembly. While the spreader element of the dowel is being driven in, the spring element acting on the receiving sleeve is tensioned. To facilitate utilization of the working capacity now stored in the spring element, for example, for a subsequent loading operation, it is advantageous if the receiving sleeve can be locked in the tenstioned position of the spring element. Automatic locking of the receiving sleeve can be effected by means of a spring detent when an appropriate position has been reached.

To facilitate the pivotal displacement of the driving or percussion attachment out of the path of the drilling tool, it is advantageous if the percussion attachment is axially slidable realtive to the device housing in the direction of the driving action. Accordingly, before the pivotal displacement of the percussion attachment, it is disengaged from the drilling tool by sliding it in the axial direction of the tool outwardly away from the device housing.

To prevent the percussion attachment from slipping off the spreading or fastening element as it is driven in, it is advantageous if the attachment has a centering part as its front end, that is, the end which applies the driving action to the element. This centering part can, for example, be constructed as a projecting tip which engages within a corresponding indentation in the head of the fastening element. It would be possible, however, to arrange the centering part as a cap which fits over the head of the fastening element. To prevent any accidental pivotal displacement of the attachment which could cause the device to slip off a fastening element as it is being inserted, it is advantageous if the percussion attachment can be locked on to the device housing when it is axially aligned over the drilling tool. This locking action is achieved by sizing the cutout in the attachment so that its length is less than the overall length of the drilling tool. As a result, the percussion attachment must be first displaced in the axial direction by a sufficient distance so that it can be pivoted clear of the drilling tool. This locking action, however, may lead to overloading of the drilling tool. Therefore, it is safer if the device is provided with grooves, pins or appropriate recesses for effecting the locking action.

In addition to the locking action when the percussion attachment is positioned for use, it is advantageous if it is displaced from its working position against the force of a torsion spring. With such a feature, the percussion attachment automatically returns into its working positioned aligned with the axis of the drilling tool when any force restraining it in the pivotally displaced position is released. To avoid manually restraining the percussion attachment when it is pivotally displaced while a borehole is drilled, it is preferred that the attachment is locked in the pivotally displaced position with its axis disposed at right angles to the axis of the drilling tool. Accordingly, it can be ensured that the borehole can be drilled without any interference from the percussion attachment. Generally, drilling devices are relatively heavy and, in most cases, must be held with both hands. To render it unnecessary to release one hand from the device in releasing the percussion attachment for movement into its operating position, it is advantageous if a push key is mounted on the device housing in the region of its grip handle permitting the release of the attachment from its pivotally displaced position. The push key can be arranged so that it is operated with the thumb of one hand holding onto the grip handle. The releasing action can be transmitted from the push key through rods to a latch or other member which locks the attachment in its pivotally displaced position.

To provide an overall efficient operation in the placement of the fastening elements or dowel assemblies, the element or assembly can be mounted in a magazine secured on the housing of the device. Accordingly, in a preferred arrangement, each element or assembly is arranged in a position to be removed from the magazine in coaxial alignment with the percussion attachment when it is in its pivotally displaced position out of the axial path of the drilling tool. With the element or assembly held in front of the percussion attachment, the attachment can be returned into its working position in alignment with and enclosing the drilling tool, after a borehole has been drilled. The element or assembly can be held in position in front of the percussion attachment by a receiving sleeve or other similar member.

In most instances a hammer drill or drilling device must be held in both hands, one, because of its weight, and two, to provide effective guidance. To facilitate effective handling of the device, it is advantageous if the percussion attachment includes a U-shaped handle for moving it into its pivotally displaced position. The legs of the handles extend perpendicularly to the driving axis of the percussion attachment while the bight portion of the handle extends parallel to the driving axis. Since the handle is connected to the attachment, it facilitates the pivotal movement out of the working position of the attachment. The arrangement of the handle facilitates adequate guidance of the device in both of the positions of the percussion attachment.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
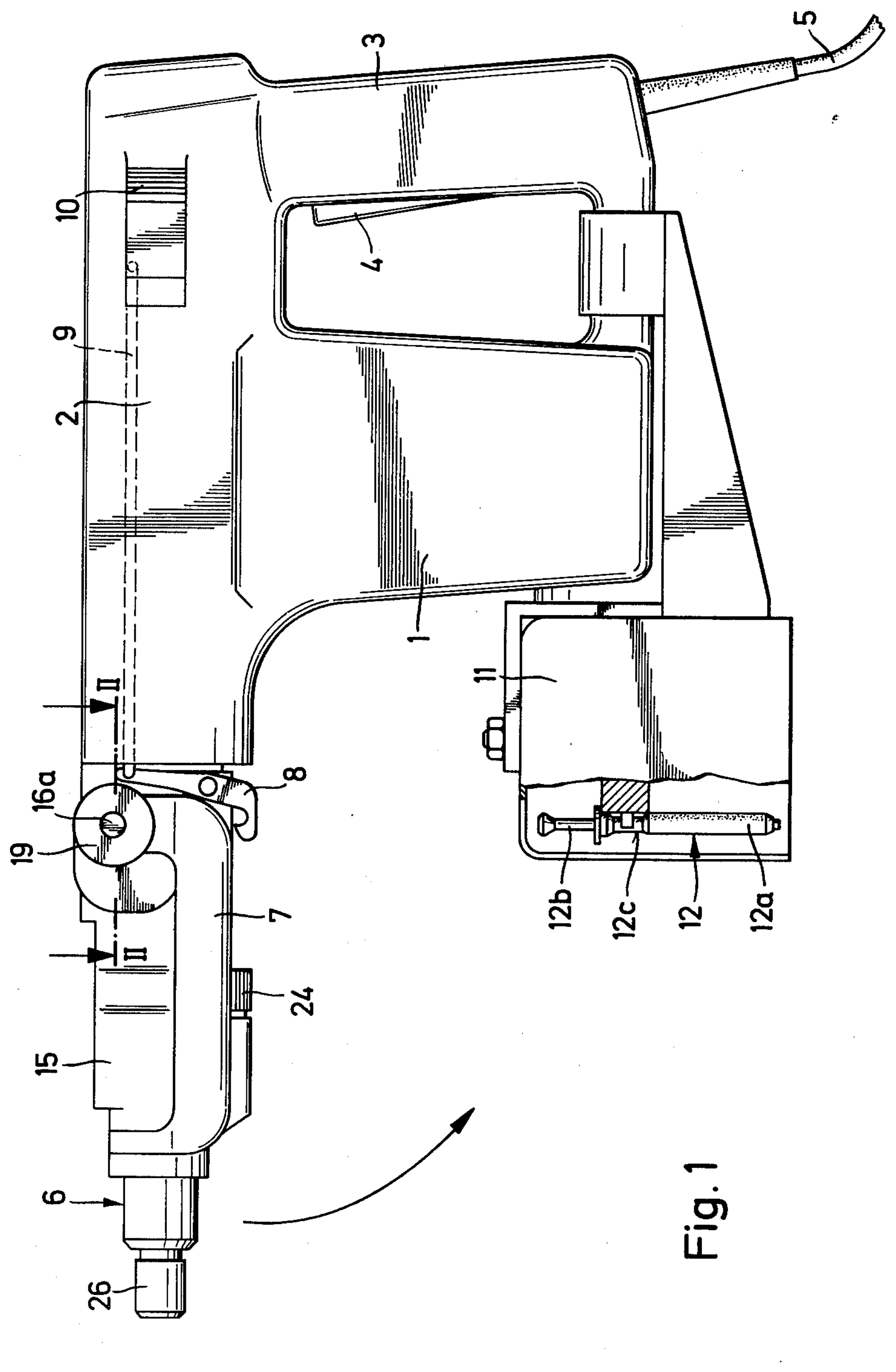
FIG. 1 is a side view of a drilling and driving device embodying the present invention arranged for inserting a fastening element or dowel assembly into a borehole.
Figure 4:
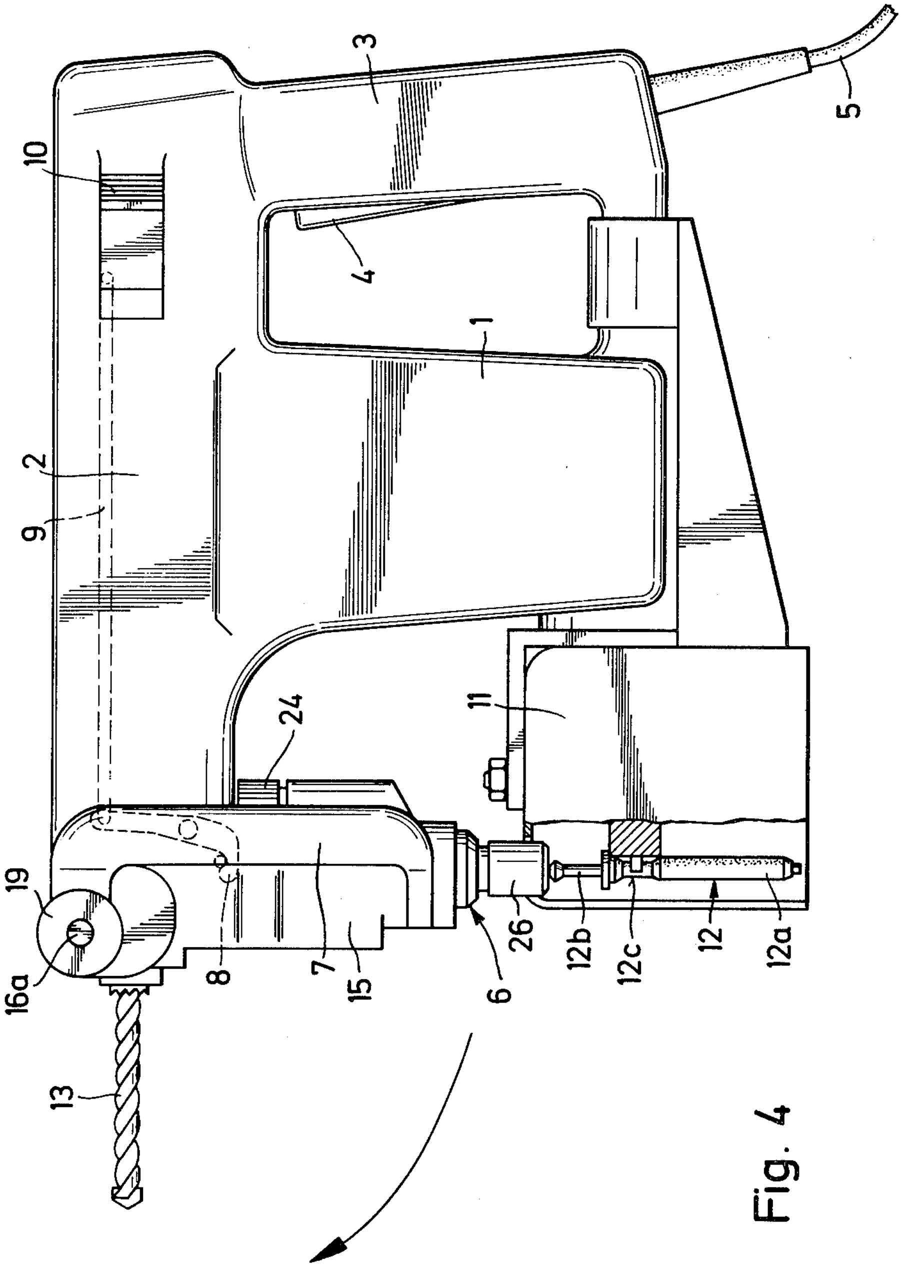
FIG. 4 is a side view, similar to FIG. 1, however, with the driving attachment of the device pivotally displaced relative to the driving and drilling direction.

In FIG. 1 a drilling and driving device is illustrated embodying the present invention. As viewed in FIG. 1 the left hand end or face of each part is considered to be the front end and the right hand end or face is the rear end. The right hand portion of the device includes a housing made up of a motor housing 1 and a gear housing 2 connected to the motor housing. A grip handle 3 is located rearwardly of the motor housing and extends downwardly from the rear end of the gear housing 2. The grip handle 3 resembles a pistol grip and includes a switch 4 for actuating the device as well as a supply line 5 for electrical current. A receiving sleeve 6 is located at the front end of the device. As viewed in this Figure, the axis of the drilling and driving operations are the same and extend in the plane of the Figure through the upper portion of the housing and axially through the receiving sleeve 6. As can be noted from a comparision of FIGS. 1 and 4 the receiving sleeve 6 can be pivotally displaced from the position shown in FIG. 1 to the position in FIG. 4. A swing handle 7 enables the receiving sleeve to be moved between the two illustrated positions. At the front end of the gear housing there is a locking member 8. The locking member 8 is connected with a push member 10, adjacent the rear end of the gear housing 2 and just above the grip handle 3, via axially extending rods 9. As can be seen in FIG. 4, the locking member 8 holds the sleeve 6 in its pivotally displaced position. Mounted on the front face of the motor housing 1 is a magazine 11, that is, it is on the opposite side of the motor housing from the grip handle 3. A plurality of fastening elements 12 are located in the magazine 11. The fastening elements or dowel assemblies 12 include a dowel or expansion sleeve **12*a* and a fastening or expanding member 12*b*. Dowel sleeve 12*a* has a neck portion 12*c* with a reduced diameter and the fastening elements 12 are secured in the magazine 11 at the neck portion 12*c***.

Figure 2:
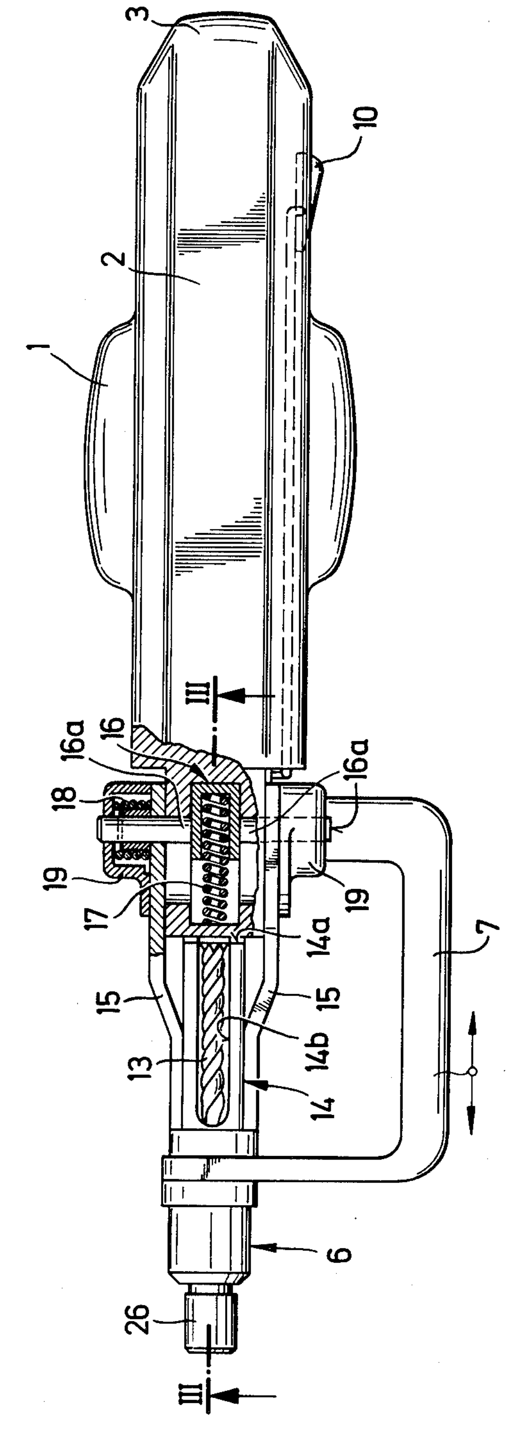
FIG. 2 is a top view of the device shown in FIG. 1, partially in section taken along the line II—II in FIG. 1.

In FIG. 2, a top view, partly in section, is shown of the drilling and driving device displayed in FIG. 1. The motor housing 1, the gear housing 2 and the grip handle 3 are illustrated in FIG. 2. Push key 10 projects slightly laterally outwardly from the gear housing and grip handle whereby its operation is facilitated. As shown in dotted lines, the rod 9 extends forwardly from the push member to the locking member 8. In FIG. 2 extending forwarding from the housing and in axially alignment with it is the receiving sleeve 6 along with its U-shaped handle 7 extending laterally outwardly from the sleeve. An axially extending drilling tool 13 is secured in the front end of the housing 2 and its axis forms the drilling axis of the device. As viewed in FIGS. 1 and 2, a percussion attachment 14 laterally encloses the drilling tool 13 and extends forwardly from it. In this position, the axis of the percussion attachment 14 is substantially coaxial with the axis of the drilling tool 13. At its rearward end, the percussion attachment has a percussion or driving shoulder 14*a* which bears against a rearward part of the drilling tool 13. Along with the receiving sleeve 6, the percussion attachment 14 is pivotally displaceable between the positions illustrated in FIGS. 1 and 4 so that, as shown in FIG. 4, the percussion attachment is displaced out of the path of the drilling tool. To effect this lateral pivotal displacement, the percussion attachment 14 includes an axially extending cutout 14*b*. Both the receiving sleeve 6 and the percussion attachment 14 are connected to the gear housing 2 by means of webs 15. Slidably mounted in the front end of the gear housing 2 is a sliding member 16. The sliding member includes a pivot pin 16*a* which projects laterally from both sides of the gear housing 2. The rearward portions of the webs 15 are mounted on the opposite ends of the pivot pin 16*a*. The sliding member 16 is biased rearwardly by a compression spring 17. Further, a torsion spring 18 is mounted on one end of the pivot pin 16*a* and biases the receiving sleeve 6—percussion attachment 14 into axial alignment with the axis of the drilling tool 13. A hood 19 encloses the torsion spring 18 to protect it from dirt. The sliding member 16 is movable in the axial direction of the housing and of the receiving sleeve-percussion attachment and can be moved forwardly by a certain distance against the force of the compression spring 17.

Figure 3:
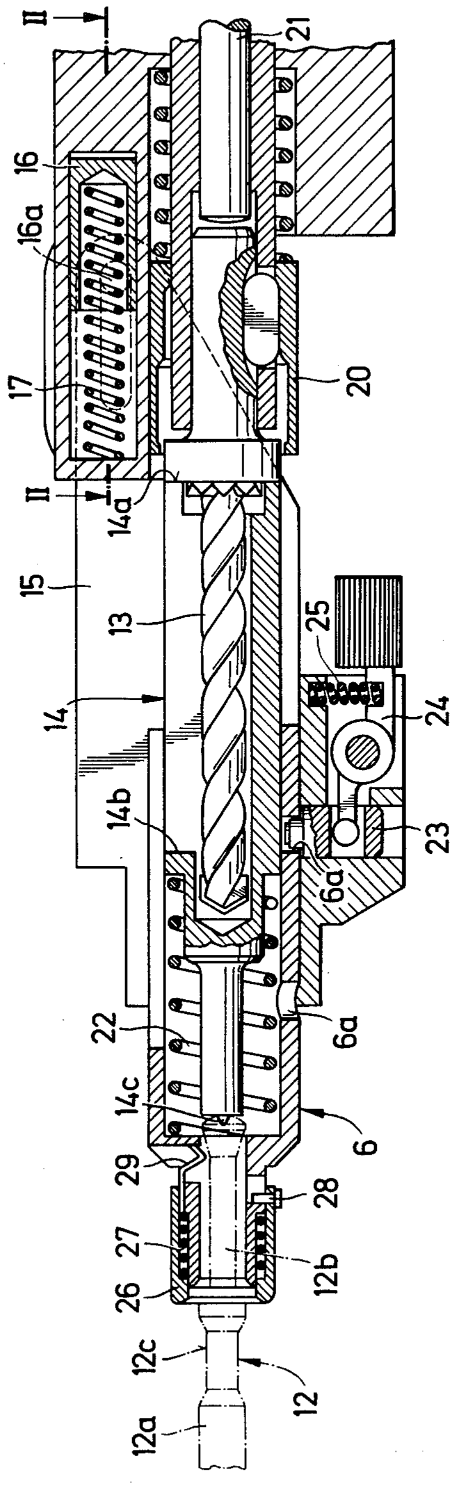
FIG. 3 is an enlarged sectional view through the device taken along the line III—III in FIG. 2.

In FIG. 3 the forward portion of the drilling and driving device is illustrated on an enlarged scale. Drilling tool 13 is inserted into a tool holder 20 located in the front end of the gear housing 2. The tool holder facilitates the transmission of rotary motion to the drilling tool 13. Transmission of axially directed driving or percussion energy is afforded through a piston shaft 21 aligned with and located rearwardly of the rear end of the drilling tool 13. Percussion attachment 14 laterally encloses the forward end of the drilling tool 13. The front portion of the percussion attachment is in the form of a pin or rod extending axially forwardly of the drilling tool and includes a centering part 14*c* at its forward end. Extending rearwardly from the rod-like forward part of the percussion attachment 14 is a sleeve-like part in which the axially extending lateral cutout 14*b* is provided. Note as shown in FIGS. 2 and 3 that the axial dimension of the cutout 14*b* is less than the axial length of the drilling tool 13, in other words, in the position of the receiving sleeve-percussion attachment illustrated in FIGS. 2 and 3 the front end of the drilling tool projects forwardly of the front end of the cutout 14*b*. As mentioned above, the rearward end of the sleeve-like part of the percussion attachment 14 forms the percussion or driving shoulder 14*a* bearing against a radially outwardly extending part of the drilling tool 13. With the receiving sleeve-percussion attachment in the position of FIGS. 1, 2 and 3 in axial alignment with the drilling tool 13, percussion energy is transmitted from the drilling tool through the shoulder 14*a* to the percussion attachment 14. Receiving sleeve 6 telescopes over the forward end of the percussion attachment 14 and is slidable relative to the attachment against the force of a spring 22 which bears at its rearward end against a shoulder on the percussion attachment and at its forward end against a surface in the interior of the receiving sleeve. As can be seen in FIG. 3, two lock openings 6*a*, spaced apart in the axial direction of the axis of the sleeve, extend through the sleeve. The two end positions of the receiving sleeve are defined by these lock openings 6*a*. Premature spreading of the fastening element or dowel assembly 12 is prevented by the locking member 23, before the assembly is completely inserted into a borehole. To initiate the driving and spreading action of the dowel assembly, a pawl 24 must be actuated against the force of a stop spring 25 before the locking member 23 is released. When the locking member 23 is released, the receiving sleeve 6 is axially movable relative to the percussion attachment 14 and the rod-like part of the attachment can be driven forwardly for driving the spreading member 12*b* into the dowel sleeve 12*a*.

Axially movably mounted on the front end of the receiving sleeve 6 for a limited axial displacement is a guide sleeve 26. A spring 27 extending in the axial direction of the receiving sleeve 6 and the guide sleeve 26 projects the guide sleeve outwardly beyond the front end of the receiving sleeve. A stop pin 28 extends through the guide sleeve 26 into a slot in the forward end of the receiving sleeve 6 for limiting the axial displacement of the guide sleeve. As can be seen in FIGS. 1 and 4 the fastening element-dowel assembly has an outwardly extending flange at the rearward end of the dowel sleeve 12*a*. The outside diameter of this flange fits into the guide sleeve 26. When the front end of the guide sleeve 26 contacts the surface of the receiving material into which a borehole has been drilled, the guide sleeve is displaced rearwardly and the flange on the dowel sleeve is inserted into the previously formed recess in the front end of the guide sleeve. A plate spring 29 located within the receiving sleeve 6 serves to retain the fastening element-dowel assembly in the sleeve.

As viewed in FIG. 3, the sliding member 16 can be noted positioned above the tool holder 20 with the sliding member pushed rearwardly by the compression spring 17. Before the receiving sleeve 6—percussion attachment 14 is pivotally displaced from the position shown in FIG. 1, it is displaced forwardly in the drilling-driving direction against the force of the compression spring. This axial displacement moves the cutout 14*b* in the attachment forwardly relative to the drilling tool 13 so that the forward end of the cutout is positioned axially forward of the front end of the drilling tool whereby the pivotal movement into the position of FIG. 4 can be carried out.

As mentioned above, FIG. 4 shows the drilling-driving device positioned for use in drilling a borehole. The receiving sleeve 6—percussion abutment 14 has been pivotally displaced into a position so that the axis of the receiving sleeve—percussion attachment forms an angle of 90° with the axis of the drilling tool 13. This pivotal displacement is effected via the handle 7. When the receiving sleeve—percussion attachment is displaced into the position in FIG. 4, it is held in this position by the locking member 8. In this pivotally displaced locked position, receiving sleeve 6 is coaxial with a fastening element-dowel assembly 12 positioned in the magazine 11. Initially, the receiving sleeve 6 is in its rearward position, because of its previous use in the driving in of a fastening element. By actuating the pawl 24, the locking member 23 is released and the sleeve is moved forwardly toward the fastening element by virtue of the spring biasing action afforded by the spring 22. In the course of this relative movement, the end of the fastening element is inserted into the receiving sleeve 6. When the push member 10 located just above the grip handle is actuated, the locking member 8 is disengaged via the rods 9 and the receiving sleeve 6—percussion attachment 14 swings or pivots together with the inserted fastening element 12 back to the position shown in FIGS. 1, 2 and 3. Subsequently, by pressing the drilling—driving device against the surface of the receiving material, the receiving sleeve 6 is moved axially rearwardly until the percussion attachment 14 engages the drilling tool 13.

While specific embodiments of the invention have been shown and described in detail to illustrate the application of the inventive principles, it will be understood that the invention may be embodied otherwise without departing from such principles.

What is claimed is:

1. A drilling and driving device including a housing having a front end from which the drilling is effected and an oppositely directed rear end, a tool holder located in the front end of said housing, an axially extending drilling tool mounted in said tool holder, said tool holder arranged to transmit rotary motion to said drilling tool for effecting a drilling action, means in said housing for transmitting percussion motion to said drilling tool in the axial direction of said drilling tool, wherein the improvement comprises an axially extending percussion attachment pivotally mounted on the front end of said housing and pivotally displaceable between a first position with said attachment extending axially outwardly from the front end of said housing and with the axis of said attachment generally aligned with the axis of said drilling tool, and a second position with the axis of said attachment extending transversely across the axis of said drilling tool, in its first position said attachment blocks said drilling tool from effecting a drilling action and in its second position said attachment is pivotally displaced out of the path of said drilling tool so that the drilling tool can effect a drilling action.

2. A drilling and driving device, as set forth in claim 1, wherein said percussion attachment in the first position thereof has a front end spaced axially outwardly from the front end of said housing and a rear end adjacent the front end of said housing, a shoulder on said attachment at the rear end thereof and said shoulder displaced in abutting contact with said drilling tool in the first position of said attachment so that in the first position of said attachment axially directed percussion motion can be imparted thereto from said drilling tool.

3. A drilling and driving device, as set forth in claim 2, wherein said attachment includes an axially extending sleeve laterally enclosing said drilling tool, said sleeve having an axially extending cutout therein so that said attachment can be pivoted between the first and second positions with said drilling tool passing through said cutout.

4. A drilling and driving device, as set forth in claim 3, wherein a receiving sleeve is arranged to hold a fastening element so that said percussion attachment can transmit percussion forces to the fastening element when said attachment is in the first position, said receiving sleeve laterally enclosing at least an axially extending front end portion of said attachment, and said receiving sleeve being axially movable relative to said attachment.

5. A drilling and driving device, as set forth in claim 4, wherein spring means are arranged in bearing contact with said percussion attachment and said receiving sleeve and said spring means biasing said receiving sleeve in the axial direction outwardly away from said housing.

6. A drilling and driving device, as set forth in claim 5, wherein means are secured to said percussion attachment for locking said receiving sleeve in position relative to said percussion attachment.

7. A drilling and driving device, as set forth in claim 1, wherein said percussion attachment is axially movably mounted on said housing in the first position thereof so that said percussion attachment can be displaced axially outwardly away from the front end of said housing.

8. A drilling and driving device, as set forth in claim 3, wherein said sleeve of said percussion attachment has a front end and a rear end and in the first position of said percussion attachment the rear end of said sleeve is adjacent the front end of said housing and the front end of said sleeve is spaced axially outwardly away from the front end of said housing, a rod-like section extending axially from the front end of said sleeve, and a centering attachment on the opposite end of said rod-like section from the front end of said sleeve.

9. A drilling and driving device, as set forth in claim 1, wherein first locking means are connected to said housing and said percussion attachment for releasably locking said percussion attachment in the second position.

10. A drilling and driving device, as set forth in claim 9, wherein torsion spring means are associated with said percussion attachment for biasing said percussion attachment from the second position thereof into the first position.

11. A drilling and driving device, as set forth in claim 10, wherein said means for releasably locking said percussion attachment are arranged to lock said percussion attachment so that the axis thereof is disposed at right angles to the axis of said drilling tool in the second position of said percussion attachment.

12. A drilling and driving device, as set forth in claim 9, wherein said housing includes a grip handle adjacent the rear end thereof, said means for releasably locking said percussion attachment includes a push member movably displaceably mounted in said housing adjacent said grip handle and accessible on the exterior of said housing so that by displacing said push member said percussion attachment can be released from its locked second position.

13. A drilling and driving device, as set forth in claim 4, wherein a magazine is mounted on said housing spaced laterally from the axis of said drilling tool, fastening elements mounted in said magazine, said fastening elements in said magazine being axially alignable with said receiving sleeve on said percussion attachment in the second position thereof so that a fastening element can be received into said receiving sleeve in the second position of said percussion attachment and when said percussion attachment is pivoted into the first position the fastening element can then be inserted into a borehole formed by said drilling tool and said fastening element can be driven into the borehole by said percussion attachment.

14. A drilling and driving device, as set forth in claim 3, wherein said percussion attachment includes a U-shaped handle extending laterally outwardly from said sleeve of said percussion attachment which laterally encloses said drilling tool, and said U-shaped handle including a pair of legs spaced apart in the axial direction of said sleeve and extending transversely of the axial direction of said sleeve and a bight portion interconnecting said legs and disposed in generally parallel relation to and located laterally outwardly from the axis of said sleeve.

15. A drilling and driving device, as set forth in claim 13, wherein said fastening element includes a dowel sleeve insertable into a borehole formed by said drilling tool and a pin-like member positioned in said dowel sleeve and axially displaceable through the dowel sleeve by said percussion attachment.

16. A drilling and driving device, as set forth in claim 3, wherein a member is mounted in the front end of said housing and is displaceable therein in the axial direction of said drilling tool, spring means biasing said member in the axial direction of said drilling tool into the front end of said housing toward the rearward end thereof, a pivot pin mounted in said member and extending transversely of the axial direction of said drilling tool, said percussion attachment includes webs mounted on said pivot member and extending axially outwardly from said pivot member in the first position of said percussion attachment away from the front end of said housing, and torsion spring means mounted on said pivot pin for biasing said percussion attachment from the second position thereof into the first position.

17. A drilling and driving device, as set forth in claim 16, wherein in the first position of said percussion attachment said drilling tool extends in the axial direction outwardly from the front end of said housing for a greater distance than the end of said cutout in said sleeve more remote from the front end of said housing and said percussion attachment being axially displaceable in the first position outwardly from the front end of said housing so that the end of said cutout moves relative to the front end of said housing and is spaced axially outwardly from the front end of said drilling tool located axially outwardly from the end of said housing so that in pivoting said attachment said drilling tool can move through said cutout.

18. A drilling and driving device, as set forth in claim 1, wherein second locking means are associated with said housing and said percussion attachment for releasably securing said percussion attachment in the first position.

* * * * *